United States Patent
Hagio et al.

(10) Patent No.: US 8,549,843 B2
(45) Date of Patent: Oct. 8, 2013

(54) METHOD OF CONTROLLING EXHAUST GAS PURIFICATION SYSTEM AND EXHAUST GAS PURIFICATION SYSTEM

(75) Inventors: Kenji Hagio, Fujisawa (JP); Takashi Ikeda, Fujisawa (JP); Shigeru Ikeda, Fujisawa (JP); Takao Onodera, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 832 days.

(21) Appl. No.: 12/224,605

(22) PCT Filed: Nov. 21, 2006

(86) PCT No.: PCT/JP2006/323183
§ 371 (c)(1),
(2), (4) Date: Sep. 2, 2008

(87) PCT Pub. No.: WO2007/108167
PCT Pub. Date: Sep. 27, 2007

(65) Prior Publication Data
US 2009/0007549 A1    Jan. 8, 2009

(30) Foreign Application Priority Data
Mar. 17, 2006    (JP) .............................. JP2006-074379

(51) Int. Cl.
*F01N 3/02*  (2006.01)
*B01D 53/94*  (2006.01)
*F02D 41/40*  (2006.01)

(52) U.S. Cl.
USPC ................ 60/295; 60/286; 60/297; 60/299; 60/300; 60/311

(58) Field of Classification Search
USPC ..................... 60/297, 286, 295, 311
See application file for complete search history.

(56) References Cited

U.S. PATENT DOCUMENTS

7,631,493 B2 * 12/2009 Shirakawa et al. ............. 60/297
7,640,731 B2 *  1/2010 Huang ............................ 60/297
(Continued)

FOREIGN PATENT DOCUMENTS

JP    2002-066813    8/2002
JP    2004-225579    8/2004
(Continued)

OTHER PUBLICATIONS

Machine Translation JP2005-291057 Done Nov. 29, 2012.*
(Continued)

*Primary Examiner* — Kenneth Bomberg
*Assistant Examiner* — Dapinger Singh
(74) *Attorney, Agent, or Firm* — Staas & Halsey LLP

(57) ABSTRACT

In in-cylinder fuel multi-injection conducted during forced regeneration of a diesel particulate filter ("DPF"), control maps for multi-injection are constructed so as to be different for a first gas temperature raising control, which raises a catalyst temperature index temperature to a first judgment temperature only by multi-injection, and for a subsequent second exhaust gas temperature raising control, wherein post-injection is conducted in addition to multi-injection to raise a filter temperature index temperature to a second judgment temperature. In so doing, exhaust gas flowing into the DPF can be rapidly raised in temperature when performing forced regeneration of the DPF, thereby shortening the forced regeneration time and improving fuel consumption for forced regeneration.

6 Claims, 3 Drawing Sheets

(56) References Cited

U.S. PATENT DOCUMENTS

| | | |
|---|---|---|
| 2003/0145581 A1 | 8/2003 | Tashiro et al. |
| 2004/0144069 A1 | 7/2004 | Gabe et al. |
| 2005/0022513 A1 | 2/2005 | Kitahara |
| 2005/0217253 A1* | 10/2005 | Onodera et al. .............. 60/295 |

FOREIGN PATENT DOCUMENTS

| | | |
|---|---|---|
| JP | 2005-48747 | 2/2005 |
| JP | 2005-54632 | 3/2005 |
| JP | 2005-61296 | 3/2005 |
| JP | 2005-282478 | 10/2005 |
| JP | 2005-291057 | 10/2005 |
| JP | 2005-299403 | 10/2005 |

OTHER PUBLICATIONS

International Search Report mailed on Feb. 27, 2007 in connection with International Application No. PCT/JP2006/323183.
Patent Abstracts of Japan, Publication No. 2004-225579, Published Aug. 12, 2004.

* cited by examiner

METHOD OF CONTROLLING EXHAUST GAS PURIFICATION SYSTEM AND EXHAUST GAS PURIFICATION SYSTEM

CROSS REFERENCE TO RELATED PATENT APPLICATIONS

This application claims the benefit under 35 U.S.C. Section 371, of PCT International Application No. PCT/JP2006/323183, filed Nov. 21, 2006, which claimed priority to Japanese Application No. 2006-074379, filed Mar. 17, 2006 in the Japanese Patent Office, the disclosures of which are hereby incorporated by reference.

BACKGROUND OF THE INVENTION

1. Field of the Invention

The present invention relates to a method of controlling an exhaust gas purification system and an exhaust gas purification system, wherein an exhaust gas temperature raising control is conducted accompanying in-cylinder multi-injection, in order to recover the purification ability of a diesel particulate filter device for purifying components in the exhaust gas of an internal combustion engine such as a diesel engine.

2. Description of the Related Art

Regulations are becoming stricter every year regarding the emission quantities of particulate matter (hereinafter referred to as PM) such as NOx, CO, and HC exhausted from diesel engines. Technology is being developed to reduce the quantities of PM exhausted outside the engine, wherein such PM is trapped by a filter referred to as a diesel particulate filter (hereinafter referred to as DPF). Among such technologies, there exists a catalyst-supporting, continuous regeneration-type DPF device.

In this continuous-regeneration-type DPF device, when the exhaust gas temperature is at or above 350° C., PM trapped at the filter is continuously purified by combustion, and the filter is self-regenerating. However, when the exhaust temperature is low, for example during a sustained, low exhaust gas temperature state such as when the internal combustion engine is idling or operating with low load or at low speeds, the low exhaust gas temperature lowers the catalyst temperature, and thus the catalyst becomes inactive. For this reason, oxidation reactions are not promoted, and it becomes difficult to regenerate the filter by oxidizing PM. Consequently, PM accumulation at the filter becomes prolonged and the filter becomes increasingly plugged, thereby resulting in the problem of the exhaust pressure rise due to filter plugging.

One technique for solving such problems involves conducting a regeneration control, wherein the temperature of the exhaust gas is forcibly raised when filter plugging exceeds a predefined amount, and trapped PM is forcibly removed by combustion. In this regeneration control, an exhaust gas temperature raising control is conducted to raise the temperature of exhaust gas flowing into the filter to a temperature equal to or greater than the temperature at which PM trapped at the filter burns. In so doing, the filter is forcibly regenerated by increasing the filter temperature to remove PM by combustion.

A method for conducting such an exhaust gas temperature raising control exists, wherein multi-injection (multi-stage delayed injection) or post-injection is conducted as part of in-cylinder fuel injection. Multi-injection is a delayed multi-stage injection, wherein fuel is injected in-cylinder over multiple stages. With multi-injection, the quantity of burned fuel inside the cylinder is increased without additional work, and the temperature of the exhaust gas exhausted from the cylinder is increased. In other words, the temperature of exhaust gas flowing into the oxidation catalyst device can be raised to a temperature equal to or greater than the catalytic activation temperature of the oxidation catalyst.

In addition, post-injection is an injection conducted during in-cylinder injection as an auxiliary injection, occurring after the primary injection at a timing later than that of the multi-injection. With post-injection, the amount of HC (hydrocarbons) is increased in the exhaust gas exhausted from the cylinder. By oxidizing the HC with an oxidation catalyst, the temperature of exhaust gas downstream to the oxidation catalyst device can be increased.

However, there is also the problem of oil dilution occurring when unburned fuel due to post-injection is mixed with the engine oil (lubricating oil). In order to counteract this problem, a control is performed such that forced regeneration is conducted when the vehicle is stopped and idling and operating conditions are stable. In this control, when a predefined quantity of PM has accumulated at the filter device, the driver is notified that regeneration control of the filter device is necessary, using warning means such as a warning lamp or similar indicator. Upon receiving this notification, the driver stops the vehicle, and by pressing a manual regeneration button, the vehicle enters manual regeneration mode and conducts forced regeneration.

In the system, an oxidation catalyst device is installed anterior (upstream) to the filter device. By using this oxidation catalyst device to oxidize HC supplied to the exhaust gas by post-injection, the temperature of exhaust gas at the filter device inlet is raised, and forced regeneration is executed.

For example, as disclosed in Japanese Patent Application Kokai Publication No. 2004-225579 and Japanese Patent Application Kohyou Publication (Translation of PCT Application) No. 2002-066813, exhaust temperature raising controls involve the following. When the exhaust gas temperature is low, such as when the engine is in a low-speed or low-load operational state, a first exhaust gas temperature raising control is conducted, wherein the first in-cylinder fuel injection control involves conducting multi-injection without post-injection. In so doing, the temperature of the oxidation catalyst device is raised to a temperature equal to or greater than the catalytic activation temperature of the oxidation catalyst. Subsequently, after having raised the oxidation catalyst device to a temperature equal to or greater than the catalytic activation temperature, post-injection is conducted in addition to multi-injection while the exhaust gas is maintained at a temperature equal to or greater than the catalytic activation temperature as part of a second exhaust gas temperature raising control wherein post-injection is conducted as part of the in-cylinder fuel injection control. In so doing, HC is supplied to the oxidation catalyst device. Since HC generates heat when oxidized by the oxidation catalyst, the exhaust gas flows into the filter device in a state of even greater temperature. Subsequently, when this high-temperature exhaust gas causes the filter device to meet or exceed the temperature at which PM starts to burn, accumulated PM is removed by combustion. At this point, a temperature maintenance control is conducted wherein multi-injections are continued in order to keep the exhaust temperature equal to or greater than the activation temperature of the oxidation catalyst, but wherein post-injections are not conducted.

In the first exhaust gas temperature raising control, the second exhaust gas temperature raising control, as well as the temperature maintenance control, the injection quantities and injection timings of the multi-injections are controlled on the basis of map data, the map data being based on engine revolutions and fuel injection quantities. This map data is configured in advance by experiment, calculation, or similar methods.

However, in the related art, control is conducted using the same map data for the first exhaust gas temperature raising control, the second exhaust gas temperature raising control, as well as the temperature maintenance control. For this reason, it is difficult to achieve both temperature raising performance and temperature maintenance performance. Consequently, there have been problems in that the time for the temperature raising becomes longer and fuel consumption worsens.

Patent Literature 1: Japanese Patent Application Kokai Publication No. 2004-225579
Patent Literature 2: Japanese Patent Application Kohyou Publication (Translation of PCT Application) No. 2002-066813

SUMMARY OF THE INVENTION

The objective of the present invention is to provide a method of controlling an exhaust gas purification system and an exhaust gas purification system. The exhaust gas purification system is provided with an oxidation catalyst and a DPF for purifying PM present in the exhaust gas of an internal combustion engine such as a diesel engine. When performing forced regeneration of the DPF, the temperature of exhaust gas flowing into the DPF is rapidly raised, and in so doing, the time for the forced regeneration is shortened, and fuel consumption for forced regeneration is improved.

A method of controlling an exhaust gas purification system of the present invention that achieves the above objective involves the following. The exhaust gas purification system is provided with the following: an exhaust gas purification device having an oxidation catalyst device supporting an oxidation catalyst and a diesel particulate filter device disposed in that order from the upstream side of an exhaust gas passage in an internal combustion engine, or, an exhaust gas purification device provided with a diesel particulate filter device supporting an oxidation catalyst; index temperature detecting means for detecting a catalyst temperature index temperature that indicates the temperature of the oxidation catalyst; and a control device that conducts a forced regeneration control for recovering the purification ability of the diesel particulate filter device based on the detection results of the index temperature detecting means. During forced regeneration control, when the catalyst temperature index temperature is lower than a predefined first judgment temperature, the control device conducts a first exhaust gas temperature raising control, wherein multi-injection is conducted, without post-injection, as part of an in-cylinder fuel injection control. When the catalyst temperature index temperature is equal to or greater than the predefined first judgment temperature, the control device conducts a second exhaust gas temperature raising control, wherein post-injection is conducted in addition to multi-injection as part of an in-cylinder fuel injection control. The injection quantities and injection timings of the multi-injection conducted in the first exhaust gas temperature raising control are calculated based on map data for the first multi-injection. The injection quantities and injection timings of the multi-injection conducted in the second exhaust gas temperature raising control are calculated based on map data for the second multi-injection, the map data for the second multi-injection being different from the map data for the first multi-injection.

The catalyst temperature index temperature that indicates the temperature of the oxidation catalyst is used because, although it is preferable to use the temperature of the oxidation catalyst (i.e., the bed temperature) as the temperature for judgment, directly measuring this temperature is difficult. For this reason, the catalyst temperature index temperature is a temperature used instead of the temperature of the oxidation catalyst. Temperatures that may be used as the catalyst temperature index temperature include: the temperature of exhaust gas flowing into the oxidation catalyst, the temperature of exhaust gas flowing out from the oxidation catalyst, or a temperature derived from both of these temperatures (the average temperature, for example). Furthermore, judgment based on both these temperatures may be used, wherein AND or OR logic is utilized. It should be appreciated that, in the case where the temperature of the oxidation catalyst can be measured, this temperature of the oxidation catalyst is to be included in the catalyst temperature index temperature referred to herein. Moreover, the oxidation catalyst activation temperature of the oxidation catalyst device (200° C. to 250° C., for example) is used as the predefined first judgment temperature.

In addition, a filter temperature index temperature that indicates the temperature of the diesel particulate filter device (DPF device) is used because, although it is preferable to use the temperature of the DPF device as the temperature for judgment, directly measuring this temperature is difficult. For this reason, the filter temperature index temperature is a temperature used instead of the temperature of the DPF device. Temperatures that may be used as the filter temperature index temperature include: the temperature of exhaust gas flowing into the DPF device, the temperature of exhaust gas flowing out from the DPF device, or a temperature derived from both of these temperatures (the average temperature, for example). Furthermore, judgment based on both these temperatures may be used, wherein AND or OR logic is utilized. It should be appreciated that, in the case where the temperature of the DPF device can be measured, this temperature of the DPF device is also to be included in the filter temperature index temperature referred to herein. Moreover, the temperature-raising target temperature of the exhaust gas (500° C. to 600° C., for example) is used as the predefined second judgment temperature.

In this control method, when the temperature of the exhaust gas is low, a first exhaust gas temperature raising control is conducted, wherein multi-injection is conducted based on the map data for the first multi-injection, and wherein post-injection is not conducted. In so doing, the efficiency of raising the exhaust gas temperature is increased, and the temperature of the exhaust gas can be raised rapidly. In addition, when the exhaust gas temperature rises and fuel present in the exhaust gas becomes oxidizable by the oxidation catalyst, a second exhaust gas temperature raising control is conducted, wherein multi-injection is conducted based on the map data for the second multi-injection, thereby maintaining the exhaust gas temperature to a certain degree, while in addition, fuel is supplied to the oxidation catalyst by post-injection, this fuel being oxidized by the oxidation catalyst and thus raising the temperature of exhaust gas flowing into the DPF filter.

The map data for the first and second multi-injections determine the injection quantities and injection timings of the multi-injections, being based on engine revolutions and fuel injection quantities. These sets of map data are configured in advance by experiment, calculation, or similar methods, and are input into the control device. During multi-injection control, the map data for the first and second multi-injections is referred to, and injection quantities and injection timings are computed from fuel injection quantities that are calculated from detected engine revolutions and the detected accelerator opening degree.

In the present invention, at this point, the map data for the first multi-injection and the map data for the second multi-injection are sets of separate map data generated to fit the objects of the respective controls. In other words, when conducting multi-injection, separate maps for multi-injection are used for when the catalyst temperature index temperature is lower than the predefined first judgment temperature (i.e., when raising the exhaust gas temperature to raise the oxidation catalyst temperature to a temperature equal to or greater than the oxidation catalyst activation temperature) and for when the catalyst temperature index temperature is equal to or greater than the first judgment temperature (i.e., when post-injection is conducted to raise the temperature of the DPF filter to a temperature equal to or greater than the PM combustion temperature). In so doing, the exhaust gas flowing into the DPF filter is efficiently and rapidly raised in temperature, thereby shortening the time for the forced regeneration as well as improving the fuel consumption for forced regeneration.

Furthermore, the above method of controlling an exhaust gas purification system is characterized by the following. In the first exhaust gas temperature raising control, the injection quantities for the multi-injection are increased and the injection timings for the multi-injection are delayed to be later than that of fuel injection during ordinary operation. In the second exhaust gas temperature raising control, the injection quantities for the multi-injection are reduced to the quantities necessary for maintaining the exhaust gas temperature, while the delay in the injection timings for the multi-injection is reduced to less than that of the injection timings for multi-injection during the first exhaust gas temperature raising control. In the present invention, by conducting these controls, exhaust gas flowing into the DPF filter is efficiently and rapidly raised in temperature.

In addition, the forced regeneration control herein also includes a traveling automatic regeneration control that automatically conducts forced regeneration while the vehicle is in motion, being conducted when the plugging state of the DPF device exceeds a predefined state. However, since manual regeneration control is more common, it is preferable that the forced regeneration control herein includes manual regeneration control. In manual regeneration control, forced regeneration is initiated by receiving regeneration start command input from the driver, the driver being encouraged to start regeneration of the DPF device by warning means such as a blinking lamp that activates when the plugging state of the DPF device exceeds a predefined state.

Additionally, an exhaust gas purification system of the present invention that achieves the above object involves the following. The exhaust gas purification system is provided with: an exhaust gas purification device having an oxidation catalyst device supporting an oxidation catalyst and a diesel particulate filter device disposed in that order from the upstream side of an exhaust gas passage in an internal combustion engine, or, an exhaust gas purification device provided with a diesel particulate filter device supporting an oxidation catalyst; index temperature detecting means for detecting a catalyst temperature index temperature that indicates the temperature of the oxidation catalyst; and a control device that conducts a forced regeneration control for recovering the purification ability of the diesel particulate filter device based on the detection results of the index temperature detecting means. During forced regeneration control, when the catalyst temperature index temperature is lower than a predefined first judgment temperature, the control device conducts a first exhaust gas temperature raising control, wherein multi-injection is conducted, without post-injection, as part of an in-cylinder fuel injection control. When the catalyst temperature index temperature is equal to or greater than the predefined first judgment temperature, in the exhaust gas purification system that conducts a second exhaust gas temperature raising control, wherein post-injection is conducted in addition to multi-injection as part of an in-cylinder fuel injection control, the control device calculates injection quantities and injection timings for the multi-injection conducted in the first exhaust gas temperature raising control based on map data for the first multi-injection. The control device calculates injection quantities and injection timings for the multi-injection conducted in the second exhaust gas temperature raising control based on map data for the second multi-injection, the map data for the second multi-injection being different from the map data for the first multi-injection.

Furthermore, the above exhaust gas purification system is configured as follows. In the first exhaust gas temperature raising control, the control device increases the injection quantities for the multi-injection and delays the injection timings for the multi-injection to be later than that of fuel injection during ordinary operation. In the second exhaust gas temperature raising control, the control device reduces the injection quantities for the multi-injection to the quantities necessary for maintaining the exhaust gas temperature, while also reducing the delay in the injection timings for the multi-injection to less than that of the injection timings for the multi-injection during the first exhaust gas temperature raising control.

Furthermore, in the above exhaust gas purification system, the control device is configured to conduct control such that manual regeneration control is included in the forced regeneration control.

As a result of these configurations, an exhaust gas purification system is provided whereby the above method of controlling an exhaust gas purification system can be implemented, and wherein similar operational advantages are accomplished.

According to the method of controlling an exhaust gas purification system and the exhaust gas purification system of the present invention, the following is realized. An exhaust gas purification system is provided, the system including an oxidation catalyst and a DPF device for purifying PM present in exhaust gas, being provided in the exhaust gas passage of an internal combustion engine such as a diesel engine. In this system, multi-injections are conducted as part of an in-cylinder fuel injection during forced regeneration of the DPF. Different control maps for these multi-injections are prepared to suit respective controls: a first exhaust temperature raising control, which raises a catalyst temperature index temperature to a first judgment temperature using multi-injection only; and a subsequent second exhaust gas temperature raising control, which conducts post-injection in addition to multi-injection in order to raise the temperature of a filter temperature index temperature to a second judgment temperature. For this reason, during the execution of the forced DPF regeneration, exhaust gas flowing into the DPF is rapidly and efficiently raised in temperature. In so doing, the time for the forced regeneration can be shortened, and the fuel consumption for forced regeneration can be improved.

Furthermore, in the first exhaust gas temperature raising control, by increasing the injection quantities for multi-injection and delaying the injection timings, the temperature raising time can be shortened. In the second exhaust gas temperature raising control, by throttling the injection quantities for multi-injection, controlling the injection timings in the opposite direction to reduce the delay to less than that of the injection timings of the first exhaust gas temperature raising control, and maintaining the elevated temperature of the exhaust gas, the exhaust gas temperature can be raised more efficiently and the temperature of the exhaust gas can be maintained.

DESCRIPTION OF EMBODIMENTS

DETAILED DESCRIPTION OF THE INVENTION

Hereinafter, the method of controlling an exhaust gas purification system and the exhaust gas purification system in accordance with the embodiments of the present invention will be described with reference to the attached drawings.

Figure 1:
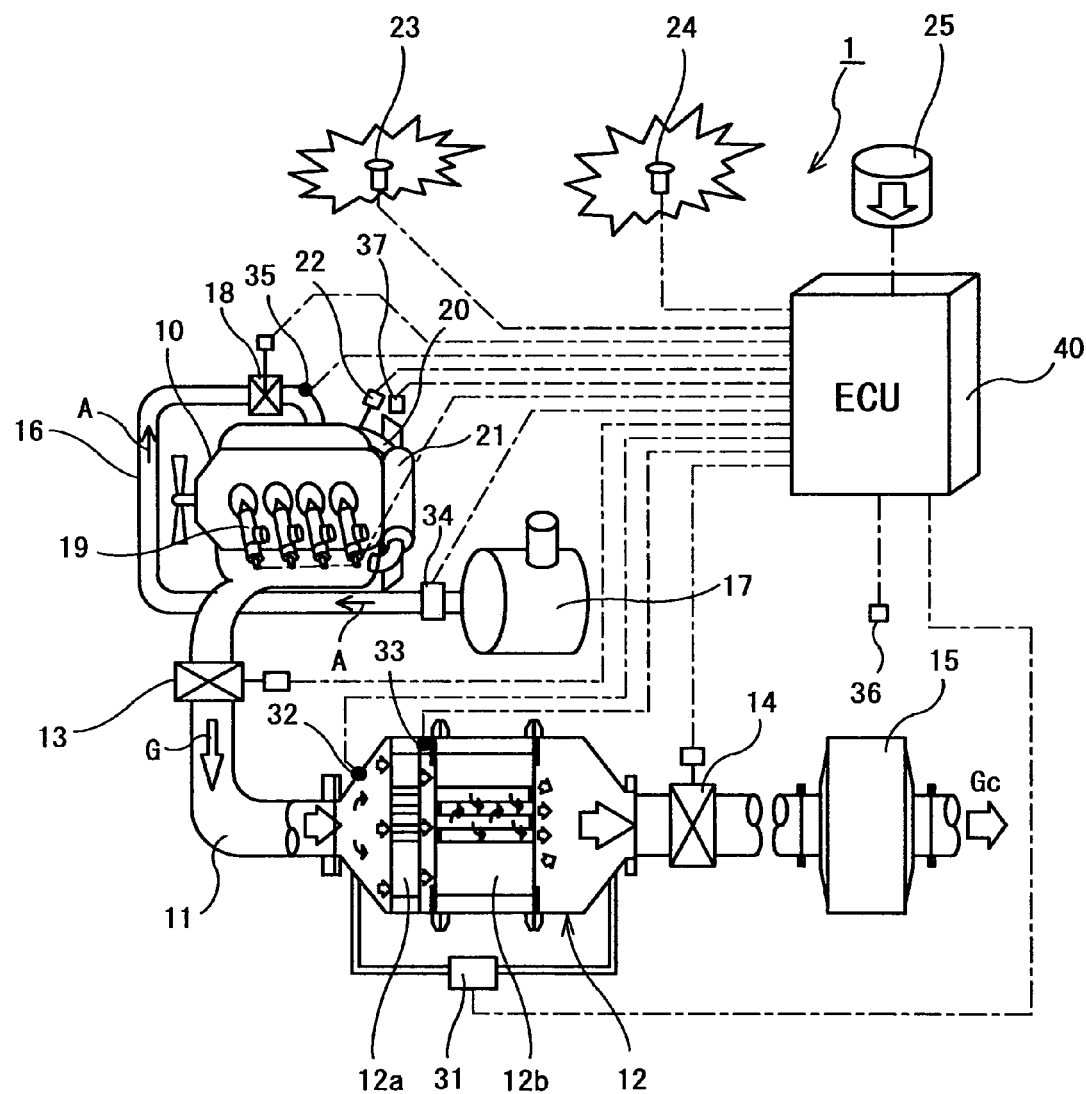
FIG. 1 is a system configuration diagram of an exhaust gas purification system of an embodiment in accordance with the present invention.

FIG. 1 shows the configuration of an exhaust gas purification system 1 in accordance with an embodiment of the present invention. The exhaust gas purification system 1 is configured having an exhaust gas purification device 12 provided in the exhaust gas passage 11 of a diesel engine (internal combustion engine) 10. The exhaust gas purification device 12 is a continuous regeneration-type DPF (diesel particulate filter) device, and is configured having an upstream oxidation catalyst device 12a and a downstream catalyst-supporting filter device 12b. In addition, an exhaust brake valve 13 is provided upstream to the exhaust gas purification device 12, and an exhaust throttle valve 14 is provided downstream to the exhaust gas purification device 12. It should be appreciated, however, that the relative positions of the exhaust brake valve 13 and the exhaust throttle valve 14 are not particularly limited, and either may be placed upstream to the other. Moreover, the relative positions of these valves with respect to the exhaust gas purification device 12 are not particularly limited. However, in consideration of the effectiveness of the exhaust brake, it is preferable to dispose the exhaust brake valve 13 upstream and the exhaust throttle valve 14 downstream. Additionally, a silencer 15 is provided downstream to the exhaust gas purification device 12.

The oxidation catalyst device 12a is formed supporting an oxidation catalyst such as platinum (Pt) on a carrier body having a porous ceramic honeycomb or similar structure. The catalyst-supporting filter device 12b is formed as a monolith honeycomb wall-flow type filter or similar filter, wherein the inlets and outlets of the porous ceramic honeycomb channels are blocked in an alternating pattern. A catalyst such as platinum or cerium oxide is then supported on the filter portion. PM (particulate matter) present in an exhaust gas G is thus trapped at the porous ceramic walls.

Additionally, in order to estimate the accumulated quantity of PM at the catalyst-supporting filter device 12b, differential pressure sensors 31 are provided in conducting pipes coupled to either end of the exhaust gas purification device 12. In addition, for regeneration control of the catalyst-supporting filter device 12b, an oxidation catalyst inlet exhaust temperature sensor 32 is provided upstream to the oxidation catalyst device 12a, and a filter inlet exhaust temperature sensor 33 is provided between the oxidation catalyst device 12a and the catalyst-supporting filter device 12b.

The oxidation catalyst inlet exhaust temperature sensor 32 detects a first exhaust gas temperature Tg1, being the temperature of the exhaust gas flowing into the oxidation catalyst device 12a. In addition, the filter inlet exhaust temperature sensor 33 detects a second exhaust gas temperature Tg2, being the temperature of the exhaust gas flowing into the catalyst-supporting filter device 12b.

Furthermore, in an intake passage 16 there are provided an air cleaner 17, a MAF sensor (intake air mass sensor) 34, an intake throttle valve 18, and an intake temperature sensor 35 for detecting the intake temperature Ta. The intake throttle valve 18 adjusts the quantity of air A entering the intake manifold.

The output values of these sensors are input into a control device (ECU: Engine Control Unit) 40 that conducts regeneration control for the exhaust gas purification device 12, in addition to conducting general control for the engine 10. Using control signals output from the control device 40, components such as the intake throttle valve 18, a fuel injection device (injection nozzle) 19, the exhaust brake valve 13, the exhaust throttle valve 14, and an EGR valve 22 are controlled. The EGR valve 22 is provided along with an EGR cooler 21 in an EGR passage 20, and adjusts the EGR quantity.

The fuel injection device 19 is coupled to a common-rail injection system (not shown in the drawings) that temporarily stores high-pressure fuel raised in pressure by a fuel pump (not shown in the drawings). For engine operation, information is input into the control device 40, such as information on the accelerator opening degree from an accelerator position sensor (APS) 36 and information on the engine revolutions from a revolutions sensor 37, as well as information such as vehicle speed and cooling water temperature. An electricity time signal is output from the control device 40 such that a predefined quantity of fuel is injected from the fuel injection device 19.

In addition, a blinking lamp (DPF lamp) 23 acting as warning means, a malfunction lamp 24, and a manual regeneration button (manual regeneration switch) 25 are provided, such that the regeneration control of the exhaust gas purification device 12 may be conducted by not only automatic forced regeneration while traveling, but also forced regeneration when the driver arbitrarily stops the vehicle. Via these alert means 23 and 24, the driver is alerted when the trapped amount of PM at the catalyst-supporting filter device 12b exceeds a fixed amount and the catalyst-supporting filter device 12b becomes plugged.

In the control of the exhaust gas purification system 1, PM is trapped during ordinary operation. During ordinary operation, the system is monitored to determine whether or not it is time to regenerate. If it is determined that it is time to regenerate, a warning is issued or automatic regeneration while traveling is conducted. In the case of a warning, manual regeneration is conducted as a result of the driver receiving the warning and operating a manual regeneration button 25.

Figure 2:
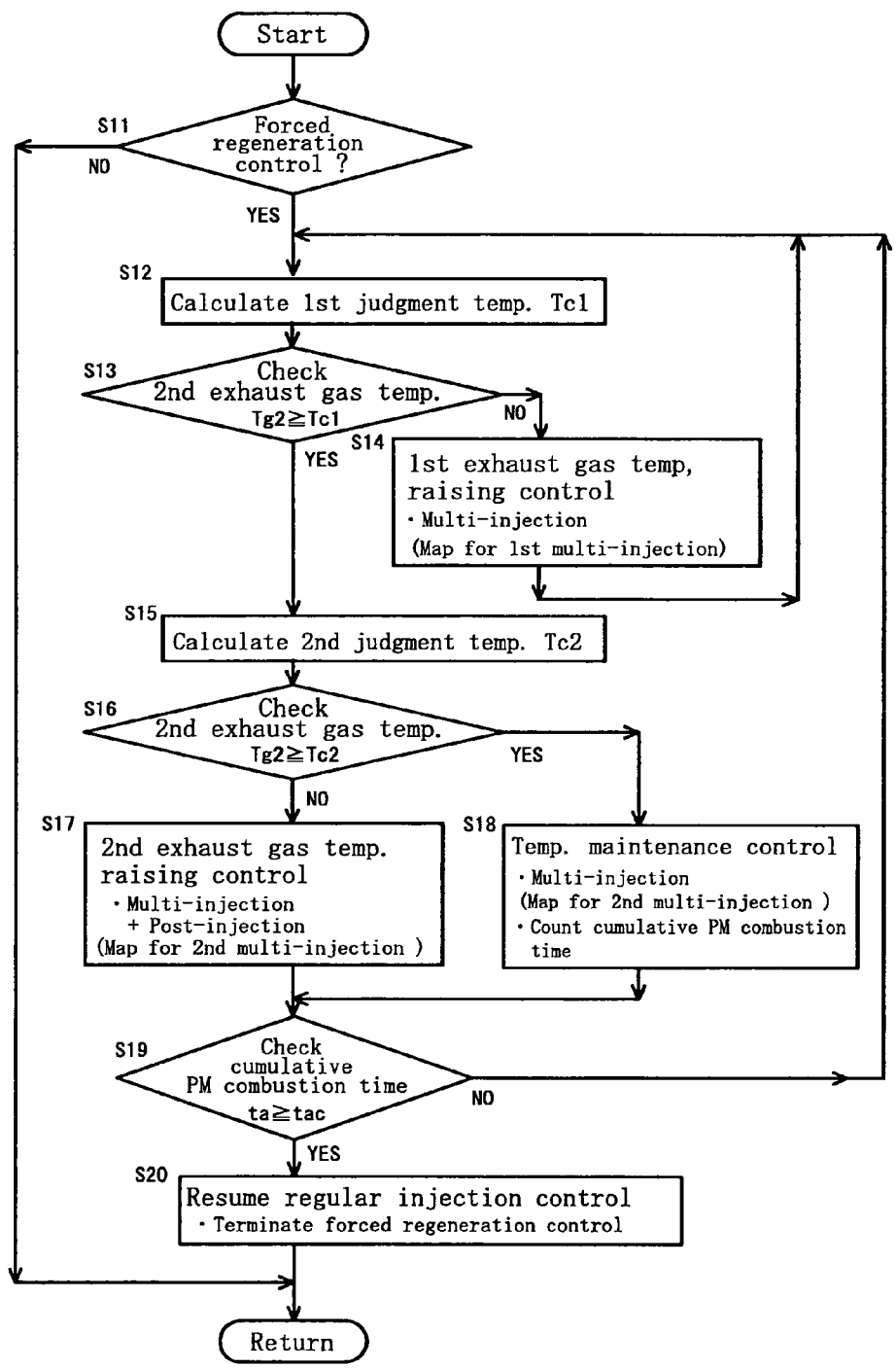
FIG. 2 is a diagram for illustrating an example of forced regeneration control flow.

Subsequently, forced regeneration is conducted, being either manual regeneration or automatic regeneration while traveling. In the present embodiment, forced regeneration is conducted according to a control flow like those shown by way of example in FIGS. 2 and 3. In FIG. 2, a second exhaust gas temperature Tg2 detected by the filter inlet exhaust temperature sensor 33 is used as the catalyst temperature index temperature that indicates the temperature (bed temperature) of the oxidation catalyst. When the second exhaust gas temperature Tg2 reaches or exceeds a predefined first judgment temperature Tc1, unburned fuel is supplied upstream to the oxidation catalyst device 12a by post-injection. In addition, the second exhaust gas temperature Tg2 detected by the filter inlet exhaust temperature sensor 33 is also used as the filter temperature index temperature that indicates the temperature of the catalyst-supporting filter device 12b. When the second exhaust gas temperature Tg2 reaches or exceeds a predefined second judgment temperature Tc2, a temperature maintenance control is conducted by multi-injection, without conducting post-injection.

When the control flow in FIG. 2 starts, it is first determined in step S11 whether or not forced regeneration control is to be conducted, whether by automatic regeneration while traveling or manual regeneration. If forced regeneration control is not to be conducted, the process returns without executing forced regeneration control, and ordinary operation control is conducted. If it is determined that forced regeneration control should be conducted in step S11, the process proceeds to step S12.

When the following occurs, forced regeneration control is conducted. In the case of manual regeneration, the driver who is encouraged to conduct manual regeneration, stops the vehicle and operates the manual regeneration button 25, thereby commencing forced regeneration control. In this case, when the differential pressure exceeds a predefined differential pressure value for judgment, the blinking lamp (DPF lamp) 23 that acts as warning means is made to blink, thereby encouraging the driver to conduct manual regeneration of the DPF. This differential pressure being detected by the differential pressure sensors 31 that measures the pressure difference before and after the exhaust gas purification device 12. In addition, in the case of automatic regeneration while traveling, forced regeneration control commences when it is detected from the detected values of the differential pressure sensors 31 or other means that the amount of trapped PM at the catalyst-supporting filter device 12b has exceeded a fixed amount.

In step S12, the first judgment temperature Tc1 is calculated. The first judgment temperature Tc1 is the temperature (200° C. to 250° C., for example) at which HC (i.e., unburned fuel supplied by post-injection) is sufficiently oxidized by the oxidation catalyst of the oxidation catalyst device 12a. Such oxidation occurs when the second exhaust gas temperature (catalyst temperature index temperature) Tg2, being the exhaust gas temperature detected by the filter inlet exhaust temperature sensor 33, reaches the first judgment temperature Tc1. In addition, a value that changes according to current number of engine revolutions Ne may also be used as the first judgment temperature Tc1. In addition, instead of the second exhaust gas temperature Tg2 detected by the filter inlet exhaust temperature sensor 33, the first exhaust gas temperature Tg1 detected by the oxidation catalyst inlet exhaust temperature sensor 32 may also be used.

In the following step S13, the second exhaust gas temperature (catalyst temperature index temperature) Tg2 is checked. When the second exhaust gas temperature Tg2 is lower than the first judgment temperature Tc1 calculated in step S12, a first exhaust gas temperature raising control is conducted for a predefined time Δt1 (a time related to the check interval for the second exhaust gas temperature Tg2 in step S13) in step S14.

In the first exhaust gas temperature raising control, multi-injection is conducted on the basis of the map data for the first multi-injection, and without post-injection. In other words, when controlling the multi-injection, first a fuel injection quantity is calculated from information such as the detected engine revolutions and the detected accelerator opening degree. From this fuel injection quantity, injection quantities and injection timings for multi-injection are calculated by referring to the map data for the first multi-injection, and then multi-injection is conducted. The map data for the first multi-injection that determines the injection quantities and injection timings for the multi-injection is based on engine revolutions and fuel injection quantities. Stated differently, the map data is based on fuel injection quantities calculated from information such as the detected accelerator opening degree. This map data is configured in advance by experiment, calculation, or similar methods, and is then input into the control device. During this multi-injection, the injection quantities for multi-injection are increased, and the injection timings for multi-injection are delayed to be later than the fuel injection timings for ordinary operation. As a result of this multi-injection, the exhaust gas temperature raising efficiency is increased, and it becomes possible to rapidly raise the temperature of the exhaust gas.

In order to further improve the exhaust gas temperature raising efficiency, the above is used in conjunction with the exhaust brake valve 13 when the vehicle is stopped. By closing the exhaust brake valve 13, the escape of heat is prevented while also increasing engine load. In so doing, the exhaust gas temperature is raised efficiently and in a short time, thereby improving the performance to heat the oxidation catalyst device 12a.

After step S13, the process returns to step S12. In addition, if it is determined in step S13 that the second exhaust gas temperature Tg2 is equal to or greater than the predefined first judgment temperature Tc1, the process proceeds to step S15.

It should be appreciated that it is possible to use both the second exhaust gas temperature Tg2 detected by the filter inlet exhaust temperature sensor 33 as well as the first exhaust gas temperature Tg1 detected by the oxidation catalyst inlet exhaust temperature sensor 32, as the catalyst temperature index temperature that indicates the temperature of the oxidation catalyst. The first judgment temperature Tc1 and a third judgment temperature Tc3 are used as the predefined judgment temperatures with respect to either exhaust gas temperature. When the second exhaust gas temperature Tg2 exceeds the first judgment temperature Tc1, and in addition, when the first exhaust gas temperature Tg1 exceeds the third judgment temperature Tc3, unburned fuel is supplied upstream to the oxidation catalyst device 12a by post-injection.

Figure 3:
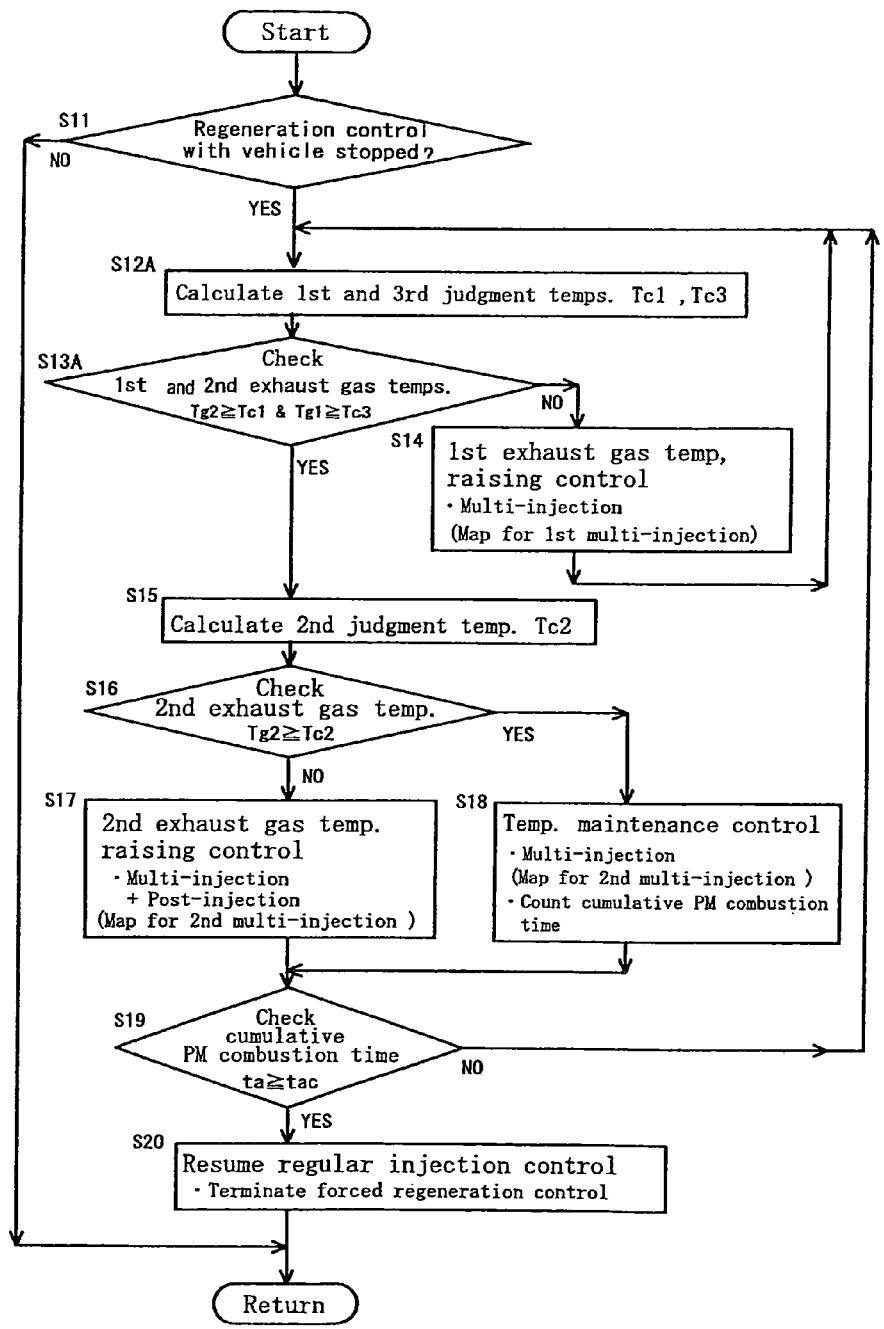
FIG. 3 is a diagram for illustrating another example of forced regeneration control flow.

In this case, the steps S12 and S13 of FIG. 2 replace the steps S12A and S13A of FIG. 3. In step S12A, the third judgment temperature Tc3 is calculated in addition to the first judgment temperature Tc1.

In addition, in step S13A, it is determined both whether or not the second exhaust gas temperature Tg2 is equal to or greater than the first judgment temperature Tc1, and whether or not the first exhaust gas temperature Tg1 is equal to or greater than the third judgment temperature Tc3. The process then proceeds to step S15 only in the case where the second exhaust gas temperature Tg2 is equal to or greater than the first judgment temperature Tc1, and in addition, the first exhaust gas temperature Tg1 is equal to or greater than the third judgment temperature Tc3. In all other cases, the process proceeds to step S14.

In step S15, the second judgment temperature Tc2 is calculated. The second judgment temperature Tc2 is the target temperature for the second exhaust gas temperature raising control in step S17. By maintaining the second exhaust gas temperature (filter temperature index temperature) Tg2 (i.e., the exhaust gas temperature detected by the filter inlet exhaust temperature sensor 33) equal to or greater than the second judgment temperature Tc2, combustion of PM trapped at the catalyst-supporting filter device 12b is maintained in a favorable state. Ordinarily, the second judgment temperature Tc2 is taken to be a value higher than the temperature (350° C., for example) at which PM starts to burn, such as approximately 500° C., for example. In addition, the value of the second judgment temperature Tc2 may also be changed in multiple stages depending on time.

In the subsequent step S16, the second exhaust gas temperature (filter temperature index temperature) Tg2 is checked. When the second exhaust gas temperature Tg2 is lower than the second judgment temperature Tc2, the process proceeds to the second exhaust gas temperature raising control in step S17. When the second exhaust gas temperature Tg2 is equal to or greater than the second judgment temperature Tc2, the process proceeds to the temperature maintenance control in step S18.

In step S17, the second exhaust gas temperature raising control is conducted for a predefined time $\Delta t2$ (a time related to the check interval for the second exhaust gas temperature Tg2 in step S16). In the second exhaust gas temperature raising control, multi-injection is conducted on the basis of map data for the second multi-injection, this map data being different from the map data for the first multi-injection. Similarly to the map data for the first multi-injection, the map data for the second multi-injection, which determines the injection quantities and injection timings for multi-injection, is based on engine revolutions and fuel injection quantities. Stated differently, the map data is based on a fuel injection quantity calculated from information such as the detected accelerator opening degree. This map data is configured in advance by experiment, calculation, or similar methods, and is input into the control device.

During this multi-injection, the injection quantities for multi-injection are reduced to the quantities necessary for maintaining the exhaust gas temperature. The delay in the injection timings for multi-injection is also reduced to be less than that of injection timings for multi-injection during the first exhaust gas temperature raising control in step S14. As a result of this multi-injection, the temperature of the exhaust gas is maintained to a certain degree. Additionally, fuel is supplied to the oxidation catalyst device 12a by post-injection, the fuel being oxidized by the oxidation catalyst, thereby raising the temperature of exhaust gas flowing into the catalyst-supporting filter device 12b.

Furthermore, in order to improve the exhaust gas temperature raising efficiency, the above is used in conjunction with an exhaust throttle valve 14 when the vehicle is stopped. The exhaust brake valve 13 is fully opened, and the exhaust throttle valve 14 is fully closed. In so doing, the passage area can be increased compared to when the exhaust brake valve 13 is closed, thereby reducing engine load. For this reason, increase in the in-cylinder temperature is reduced, thereby enabling post-injection.

Subsequently, the raising of the exhaust gas temperature is maintained by the multi-injection of the second exhaust gas temperature raising control, while in addition, unburned fuel (HC) is supplied to the exhaust gas by post-injection. This unburned fuel is oxidized by the oxidation catalyst device 12a, and by using the heat from oxidation, the temperature of the exhaust gas can be further increased. When the temperature Tg2 of the heated exhaust gas reaches or exceeds the second judgment temperature Tc2, PM trapped at the catalyst-supporting filter device 12b burns. It should also be appreciated that, in the second exhaust gas temperature raising control, the second exhaust gas temperature Tg2 may be continuously raised in temperature until reaching the control target temperature Tc2. Alternatively, the temperature raising may be conducted in two stages or multiple stages. After step S17, the process proceeds to step S19.

Additionally, if it is determined in step S16 that the second exhaust gas temperature Tg2 is equal to or greater than the second judgment temperature Tc2, a temperature maintenance control is conducted for a predefined time $\Delta t3$ (a time related to the continuous time check interval for second exhaust gas temperature Tg2 in step S16) in step S18. In the temperature maintenance control, multi-injection is conducted without post-injection as part of an in-cylinder injection of the engine 10.

In addition, in step S18, a count of the cumulative PM combustion time is conducted. In this count, the cumulative PM combustion time (ta) (ta=ta+$\Delta t3$) is counted only in the cases where the second exhaust gas temperature Tg2 is equal to or greater than the predefined second judgment temperature Tc2. After step S18, the process proceeds to step S19.

In step S19, in order to determine whether or not the regeneration control is ended, the cumulative PM combustion time (ta) is checked. In this check, it is checked whether or not the cumulative PM combustion time (ta) exceeds a predefined judgment time Tac. More specifically, if the cumulative PM combustion time (ta) exceeds the predefined judgment time Tac, regeneration control has completed, and the process proceeds to step S20. If the cumulative PM combustion time (ta) does not exceed the predefined judgment time tac, regeneration control has not been completed, and the process returns to step S12. The first exhaust gas temperature raising control in step S14, the second exhaust gas temperature raising control in step S17, or the temperature maintenance control in step S18 is then conducted until the cumulative PM combustion time (ta) exceeds the predefined judgment time tac.

Subsequently, in step S20, forced regeneration control is ended. If the vehicle is stopped, the exhaust brake valve 13 and the exhaust throttle valve 14 are returned to their ordinary operating states, and ordinary injection control is resumed. After that, the process returns.

Additionally, during these controls, the system is continuously monitored for the commencement of vehicle travel. Once travel commences, the process returns, the control flow is aborted, and the process returns to a predefined control such as ordinary operation control.

As a result of the above forced regeneration control, the following occurs. In forced regeneration control, the second exhaust gas temperature (catalyst temperature index temperature) Tg2, being the temperature of the exhaust gas detected by the filter inlet exhaust temperature sensor 33, is compared to a predefined first judgment temperature Tc1. In other words, the temperature of exhaust gas flowing into the catalyst-supporting filter device 12b is compared to the first judgment temperature Tc1. When this temperature Tg2 is lower than the first judgment temperature Tc1, a first exhaust gas temperature raising control S14 is conducted, wherein multi-injection is conducted without post-injection as part of an in-cylinder fuel injection control. When the second exhaust gas temperature Tg2 (or Tg1) is equal to or greater than the predefined first judgment temperature Tc1, a second exhaust gas temperature raising control S17 is conducted, wherein post-injection is conducted in addition to multi-injection as part of an in-cylinder fuel injection control. Furthermore, the injection quantities and injection timings for the multi-injection conducted in the first exhaust gas temperature raising control S14 are calculated based on map data for the first multi-injection. The injection quantities and injection timings for the multi-injection conducted in the second exhaust gas temperature raising control S17 can be calculated based on map data for the second multi-injection, the map data for the second multi-injection being different from the map data for the first multi-injection.

Furthermore, in the first exhaust gas temperature raising control S14, the injection quantities for the multi-injection are increased, and the injection timings for the multi-injection are delayed to be later than the fuel injection timings during ordinary operation. In the second gas temperature raising control S17, the injection quantities for the multi-injection are decreased to the quantities necessary for maintaining the exhaust gas temperature, while the delay in the injection timings for the multi-injection is reduced compared to the injection timings for the multi-injection in the first exhaust gas temperature raising control S14.

As a result of the above method for controlling an exhaust gas purification system and exhaust gas purification system 1, the following occurs. An exhaust gas purification system 1 is provided, having an oxidation catalyst device 12a and a catalyst-supporting filter device 12b for purifying PM present in exhaust gas provided in the exhaust gas passage 11 of a diesel engine 10. In this exhaust gas purification system 1, multi-injection is conducted as part of an in-cylinder fuel injection during forced regeneration of the catalyst-supporting filter device 12b. Control maps for multi-injection are configured so as to be different for a first exhaust gas temperature raising control S14, wherein a catalyst temperature index temperature Tg2 (or Tg1) is raised to a first judgment temperature Tc1 using multi-injection only, and a subsequent second exhaust gas temperature raising control S17, wherein post-injection is conducted in addition to multi-injection in order to raise a filter temperature index temperature Tg2 to the first judgment temperature Tc1. As a result, when executing forced regeneration of the catalyst-supporting filter device 12b, the exhaust gas flowing into the catalyst-supporting filter device 12b can be rapidly raised in temperature. In so doing, the forced regeneration time can be shortened, and the fuel consumption for forced regeneration can be improved.

Furthermore, in the first exhaust gas temperature raising control S14, the injection quantities for multi-injection are increased while the injection timings are delayed, thereby shortening the temperature raising time. In addition, in the second exhaust gas temperature raising control S17, the injection quantities for multi-injection are throttled, and the injection timings are controlled in the opposite direction to reduce the delay to less than that of the injection timings of the first exhaust gas temperature raising control S14, thereby maintaining the elevated temperature of the exhaust gas. For this reason, exhaust gas is efficiently raised in temperature and the temperature of the exhaust gas is maintained.

Consequently, when executing forced regeneration of the catalyst-supporting filter device 12b, exhaust gas flowing into the catalyst-supporting filter device 12b can be rapidly raised in temperature. In so doing, the time for forced regeneration can be shortened, and the fuel consumption for forced regeneration can be improved.

In the above embodiment, the combination of an upstream oxidation catalyst device 12a and a downstream catalyst-supporting filter device (DPF) 12b were described by way of example as the exhaust gas purification device 12 of the exhaust gas purification system 1. However, it should be appreciated that the exhaust gas purification device may also be configured with a filter (DPF) supporting an oxidation catalyst.

The exhaust gas purification method and exhaust gas purification system of the present invention, having the excellent advantages described above, can be installed in an internal combustion engine or similar engine onboard an automobile and used to highly advantageous effect with respect to an exhaust gas purification device wherein an oxidation catalyst device supporting an oxidation catalyst and a DPF are disposed in order from the upstream side in the exhaust gas passage of an internal combustion engine, or with respect an exhaust gas purification system provided with a DPF supporting an oxidation catalyst in the exhaust gas passage of an internal combustion engine.

What is claimed is:

1. A method of controlling a forced regeneration of an exhaust gas purification system, comprising:
    providing an exhaust gas purification system with an oxidation catalyst device supporting an oxidation catalyst for raising an exhaust gas temperature in an exhaust gas passage in an internal combustion engine and a diesel particulate filter device for burning and removing a particulate matter by an exhaust gas of which temperature is raised by the oxidation catalyst in the exhaust gas passage;
    detecting a temperature of the oxidation catalyst; and
    when a temperature of the oxidation catalyst is detected to be lower than a catalyst activation temperature, conducting a first multi-injection by injection quantities and injection timings for raising the exhaust gas temperature, based on first map data; and
    when the temperature of the oxidation catalyst is detected to be raised, while conducting the first multi-injection, to be equal to or greater than the catalyst activation temperature, conducting a second multi-injection by injection quantities and injection timings for maintaining the exhaust gas temperature, based on second map data,
    wherein the injection timings of the second multi-injection occur earlier than the injection timings of the first multi-injection, and
    wherein a second injection quantity of the second multi-injection is less than a first injection quantity of the first multi-injection.

2. The method of controlling the exhaust gas purification system according to claim 1, wherein:
    when the oxidation catalyst temperature is lower than the catalyst activation temperature, the injection quantities for the first multi-injection are increased and the injection timings for the first multi-injection occur later than multi-injection for ordinary operation; and
    when the oxidation catalyst temperature is equal to or greater than the catalyst activation temperature, the injection quantities for the second multi-injection are set to maintain the exhaust gas temperature, and the injection timings for the second multi-injection occur earlier than the injection timings for the first multi-injection.

3. The method of controlling an exhaust gas purification system according to claim 1 or 2, wherein manual regeneration control is a part of the forced regeneration control.

4. An exhaust gas purification system, comprising:
    a fuel injection device for injecting fuel in an internal combustion engine, an exhaust gas purification device provided with an oxidation catalyst device supporting an oxidation catalyst for raising an exhaust gas temperature in an exhaust gas passage in the internal combustion engine and a diesel particulate filter device for burning and removing a particulate matter by an exhaust gas of which temperature is raised by the oxidation catalyst in the exhaust gas passage, an index temperature detector for detecting a temperature of the oxidation catalyst, and a control device for controlling fuel injection quantities and injection timings for the fuel injection device, wherein, at the time of a forced regeneration,
when the oxidation catalyst temperature detected by the index temperature detector is detected to be lower than a catalyst activation temperature, the control device conducts a first multi-injection by the fuel injection device by injection quantities and injection timings for raising the exhaust gas temperature, based on first map data, and
when the oxidation catalyst temperature detected by the index temperature detector is detected to be raised, while conducting the first multi-injection, to be equal to or greater than the catalyst activation temperature, the control device conducts a second multi-injection by the fuel injection device by injection quantities and injection timings for maintaining the exhaust gas temperature, based on the second map data,
wherein the injection timings of the second multi-injection occur earlier than the delay of the injection timings of the first multi-injection, and wherein a second injection quantity of the second multi-injection is less than a first injection quantity of the first multi-injection.

5. The exhaust gas purification system according to claim 4, wherein the first map data includes data which increase the injection quantities for the first multi-injection and the injection timings occur later than injection timings for ordinary operation, and
the second map data includes data which make the injection quantities for the second multi-injection to maintain the exhaust gas temperature and make the injection timings for the second multi-injection occur earlier than the injection timings based on the map data for the first multi-injection are input.

6. The exhaust gas purification system according to claim 4 or 5, wherein the control device includes a manual regeneration control for the forced regeneration.

* * * * *